March 12, 1929.　　　E. PRICE ET AL　　　1,704,950

SHOWER VALVE

Filed Oct. 30, 1926

INVENTOR.
Emil Price
BY William A. Pfister
ATTORNEYS.

Patented Mar. 12, 1929.

1,704,950

UNITED STATES PATENT OFFICE.

EMIL PRICE AND WILLIAM A. PFISTER, OF LOS ANGELES, CALIFORNIA.

SHOWER VALVE.

Application filed October 30, 1926. Serial No. 145,194.

This invention relates to a valve adaptable for use with shower bath fixtures. More particularly, this invention pertains to a valve adapted to be placed within a vertical wall or partition with the valve stem and handle exposed for convenient operation thereof. Such types of valves are in effect embedded in the wall necessitating mutilation thereof in order to remove them. They are commonly of the compression type wherein cooperating screw threads are employed, one on the stem and the other anchored to the body of the valve. Because of wear of the threads, the latter must be renewed from time to time. It is therefore advantageous to have a thread carrying member separable from the valve body and which may be anchored thereto as desired without requiring removal of the body from the bath fixture assemblage.

The objects of this invention are first, to provide a valve body having a separable liner carrying a thread; second, to provide a liner of simplified structure, lending itself to quick and expeditious assembly and which is durable and economical to manufacture; and third, to provide a valve construction comprising elements subject to wear and so assembled as to be renewable without disturbance of the valve installation.

Figure 1:
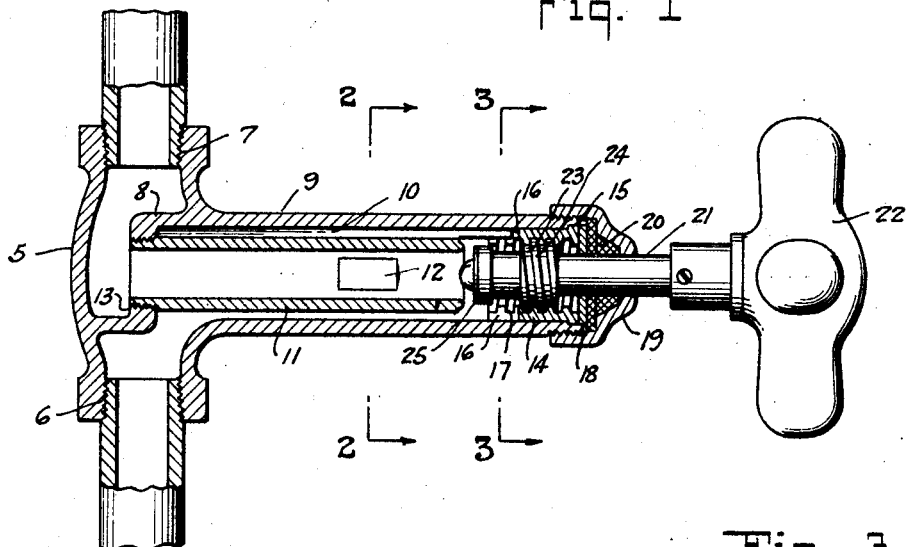
Figures 2, 3:
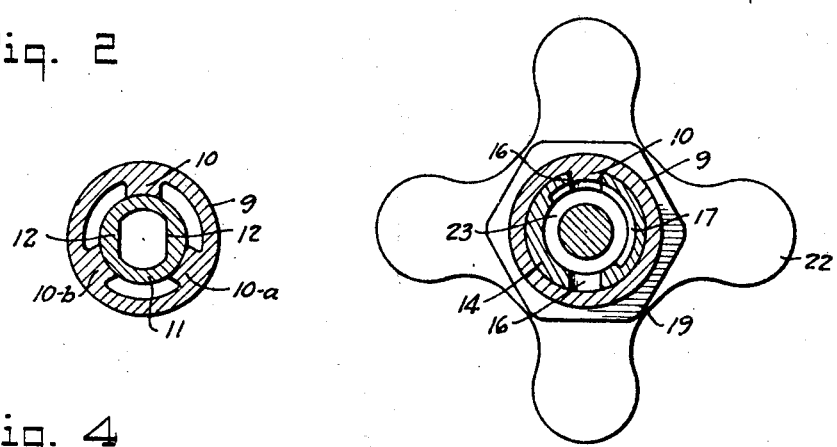
Figure 4:
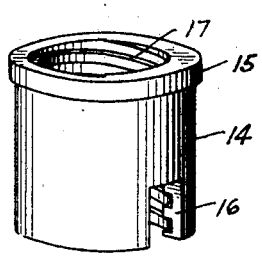

These objects together with other objects which will appear from the subjoined description are obtained by the embodiment of our invention illustrated in the accompanying drawing, in which:

Fig. 1 is an axial section through a complete valve, the stem and handle being shown in elevation; Figs. 2 and 3 are sections as seen on the lines correspondingly numbered in Fig. 1; and Fig. 4 is a perspective view of the liner.

Referring with more particularity to the drawing, a hollow valve body is indicated by 5. At opposite ends thereof are an inlet and an outlet marked 6 and 7 respectively. Dividing the valve body into inlet and outlet chambers is a partition wall 8, there being an opening for communication of the chambers. Opposite to the opening is a tubular casing extension 9 externally threaded at the outer end. Formed on the wall of the bore at equally spaced distances are longitudinally extending ribs, 10, 10ª, and 10ᵇ. These ribs end short of the outer end of the tubular extension, one of them being longer than the others, namely 10.

The opening in the partition is threaded and mounted therein is a tubular valve seat extension 11 having a valve seat ending short of the outer end of extension 9. In the bore of the seat extension are flattened protuberances 12 disposed opposite to one another so that a hold may be obtained with a flat faced tool for the purpose of removal or replacement of the seat extension which is snugly supported within the extension 9 by means of the ribs and is secured in the partition by the threads 13. At the outer end of the extension 9 is a liner 14 comprising a hollow cylindrical part having an annular external rib 15 at its outer end. The rib is arranged to be seated in a corresponding recess in the extension. At the other end of the liner and located at diametrically opposite places are slots 16. These slots are of such length that either will receive the rib 10 and thereby hold the liner from turning within the extension 9. The bore of the liner has formed on its wall a square thread 17 for cooperation with a corresponding thread on the valve stem. Mounted over the head of the liner is a metallic disk 18. A nut cap 19 has a packing 20 therein so that when the cap is in place on the extension 9 it anchors the liner in position and forms a leak tight joint.

Extending through a bore in the cap is the shank 21 of the valve stem. Mounted upon the end of the shank is a handle 22 for convenience in turning the stem. At the other end of the shank is a head 23 having external threads 24 meshing with the threads 17 on the liner. Secured to the end of head 23 by means of a screw is a washer 25 arranged to be seated on the end of seat extension 11. The valve stem is packed by means of the packing 20.

The parts are shown in assembled condition in Fig. 1 and as installed. In case it is desired to replace the tubular seat, the cap nut is unscrewed permitting the liner to be removed with the valve stem. A square bar may then be inserted in the seat extension 11 and the latter unscrewed and removed, a new one then being inserted. If the threads on the liner are so worn as to need replacement, the liner is unthreaded from the stem. A new liner is then slipped into the extension 9 with rib 10 disposed in slot 16. The stem and cap are then replaced on the extension. Obviously the removal and replacement may be performed quickly. The replacement parts are inexpensive, and the structure as a unit is durable.

Although the embodiment of the valve illustrated herein is of the type commonly used for shower bath fixtures and is suitable for concealment yet the invention is not limited to such embodiment. It may be incorporated in faucet, globe and angle valves, or any common type of shut-off.

What we claim is:

1. A valve of the class described comprising a casing having an inlet and an outlet separated by a partition having an opening and a tubular casing extension opposite to said opening, a tubular valve seat extension detachably mounted in said opening and disposed in and ending short of said casing extension, a liner disposed in said extension having a slip connection therewith and locked against rotation, said liner having an internal thread, a cap detachably mounted on said casing extension and engaging said liner to hold the latter in place, and a valve stem having a washer for seating on the outer end of said seat extension, said stem extending through said cap and having an external thread engaging the thread on said liner.

2. A valve of the class described comprising a casing having an inlet and an outlet separated by a partition having an opening and a tubular casing extension opposite said opening provided with a longitudinally extending rib, a seat extension detachably mounted in said opening and disposed in and ending short of said casing extension, a tubular liner disposed in said casing extension having a slot receiving said rib to lock it against rotation, said liner having an internal thread, a cap detachably mounted on said casing extension and engaging said liner to hold the latter in place, and a valve stem having a washer for being seated on the outer end of said seat extension, said stem extending through said cap and having an external thread engaging the thread in said liner.

3. A valve of the class described comprising a casing having an inlet and an outlet separated by a partition provided with an opening and a tubular casing extension opposite said opening including a plurality of longitudinally extending ribs, one of said ribs extending closer to the end of said extension than the others to provide a locking rib, a tubular seat extension detachably mounted in said opening and laterally supported in said casing extension by said ribs, a tubular liner disposed in said casing extension having a slot receiving said locking rib to lock against rotation, said liner having an internal thread, a cap detachably mounted on said extension and engaging said liner to hold the latter in place, and a valve stem having a washer for being seated on said seat extension, said stem extending through said cap and having an external thread engaging the thread in said liner.

In witness that we claim the foregoing we have hereunto subscribed our names this 15th day of October, 1926.

EMIL PRICE.
WILLIAM A. PFISTER.